Figure 1:
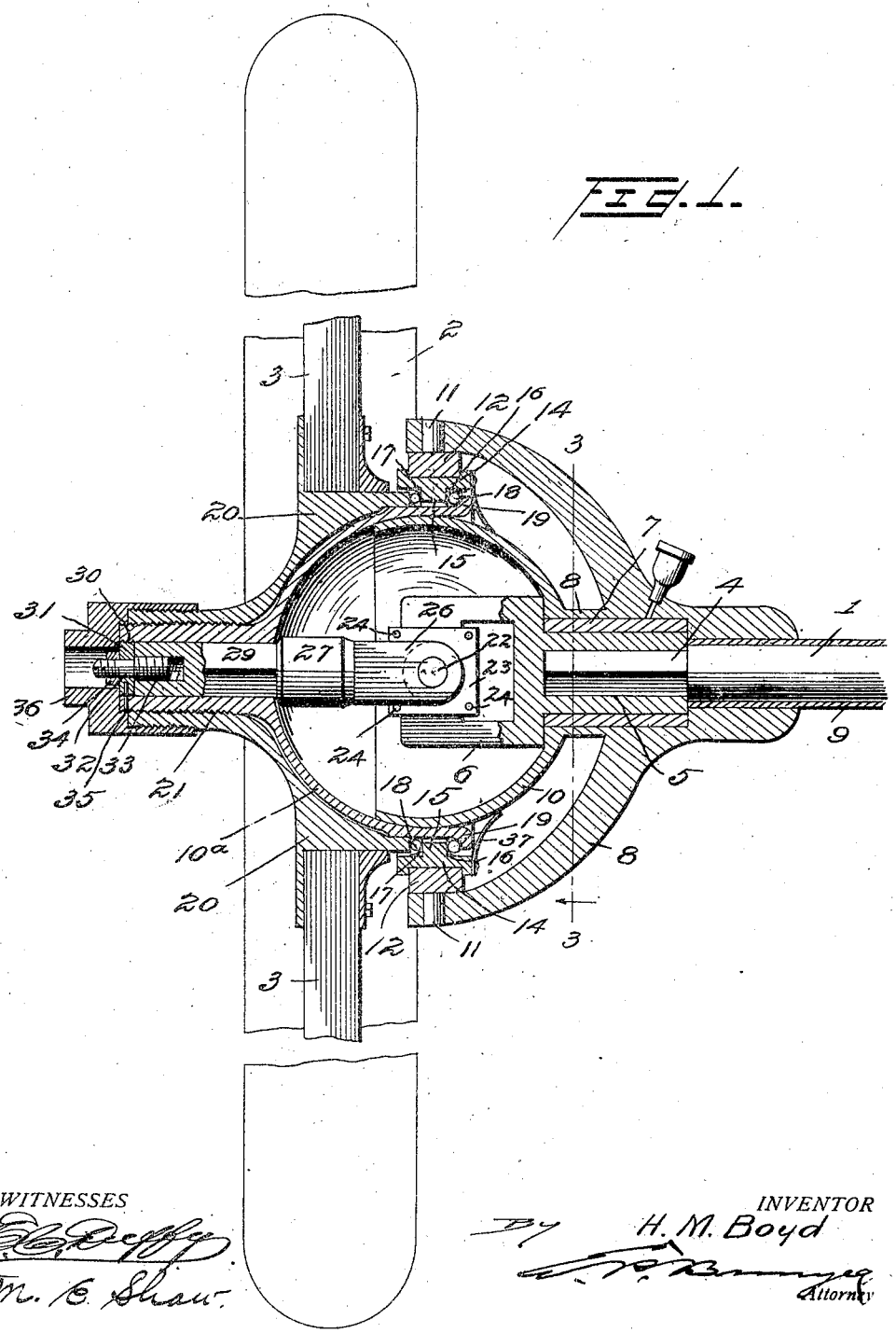

H. M. BOYD.
AXLE DRIVE.
APPLICATION FILED SEPT. 11, 1912.

1,078,032.

Patented Nov. 11, 1913.
2 SHEETS—SHEET 1.

WITNESSES

INVENTOR
H. M. Boyd
Attorney

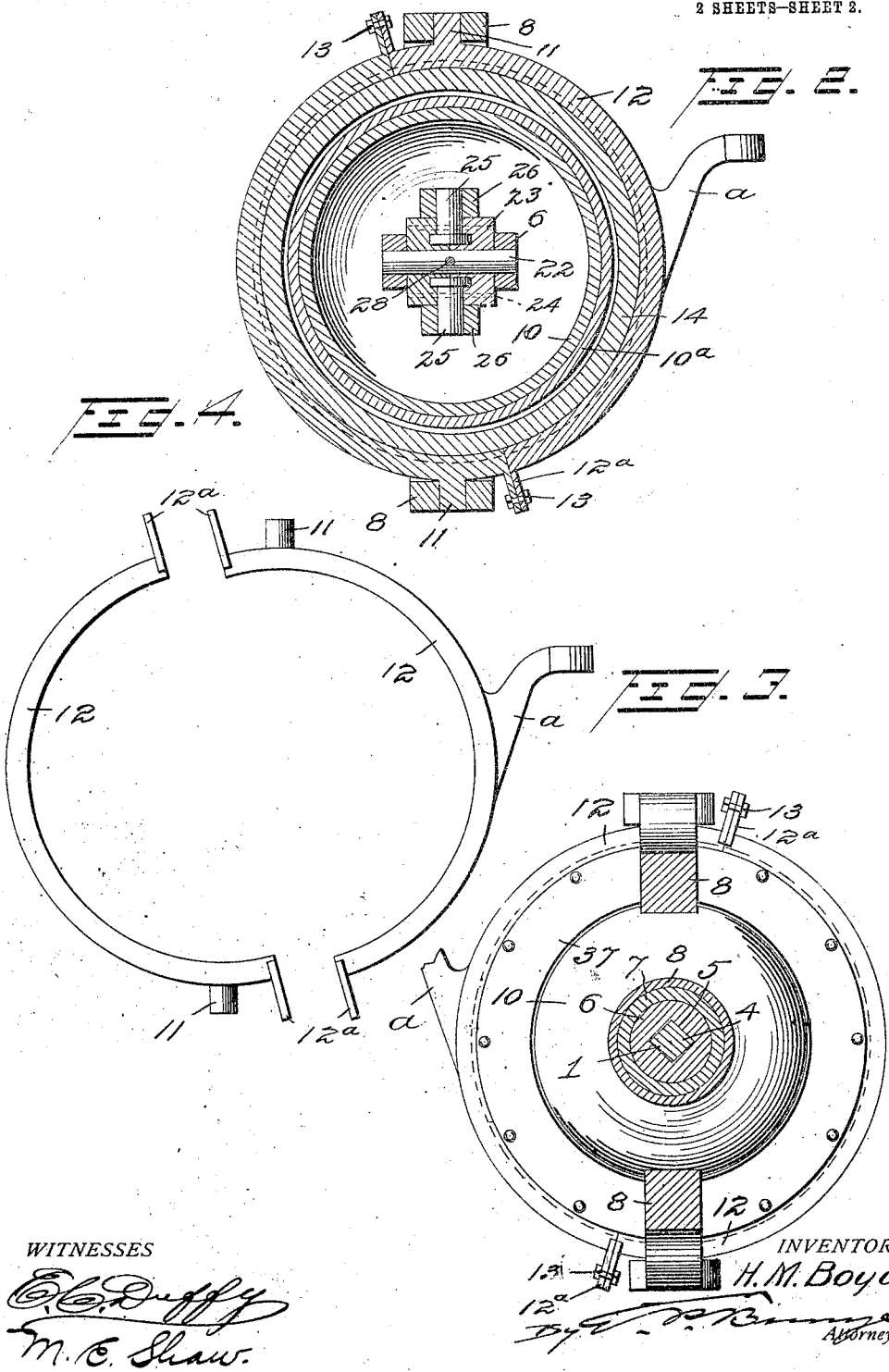

UNITED STATES PATENT OFFICE.

HARRY M. BOYD, OF CRESTON, IOWA.

AXLE-DRIVE.

1,078,032.

Specification of Letters Patent.    Patented Nov. 11, 1913.

Application filed September 11, 1912.   Serial No. 719,724.

*To all whom it may concern:*

Be it known that I, HARRY M. BOYD, a citizen of the United States, residing at Creston, in the county of Union and State of Iowa, have invented certain new and useful Improvements in Axle-Drives, of which the following is a specification.

This invention relates to axle drives for auto-vehicles, and one of the principal objects of the invention is to provide reliable and efficient means for driving the front or rear axle, or both, without interfering with the steering mechanism.

Another object of the invention is to provide a front and rear axle drive, which will not interfere with the steering mechanism of the front axle and which will prevent skidding, which will add extended life to tires and which will be easier to run over rough roads, and pull out of cavities in the roads.

These and other objects may be attained by means of the construction illustrated in the accompanying drawings, in which:

Figure 1 is central, vertical section through the front wheel. Fig. 2 is a central, vertical section of the wheel, taken at right angles to Fig. 1. Fig. 3 is a vertical section taken on line 3—3 of Fig. 1, looking in the direction indicated by the arrows. Fig. 4 is a view in elevation of the steering ring.

Referring to the drawings the numeral 1 designates the axles, 2 are the wheels and 3 are the spokes. The opposite ends of the axle 1 are squared as at 4 and fitted into a squared socket 5 formed on a universal joint member 6. The socket 5 is round upon its outer side and provided with a roller bearing or sleeve 7 which rotates within the yoke 8 connected to the axle sleeve 9. Formed on the yoke 8 is one member 10 of a globe joint. The yoke 8 is provided with perforated ends for the studs 11 formed upon the steering knuckle band 12. which is formed in two sections secured together by bolts 13 extending through flanges formed on the sections as shown in Figs. 2 and 4. The band 12 is seated in a groove surrounding the ball bearing ring 14, said ring having an inwardly projecting central portion 15. Ball cones 16 and 17 are placed against the projecting portion 15, and the balls 18 are held in position by means of the flaring end 19 of the universal joint member 10ª on one side, while the end of the hub casting 20 bears against the balls upon the other side. The member 10ª and the hub casting 20 are relatively adjustable to take up lost motion at the ball bearing, by means of a threaded connection 21.

The universal joint member 6 is substantially rectangular and is connected at its ends by means of a pin 22 extending through a rectangular block 23, made in two sections connected together by pins 24. The block 23 is recessed to receive headed studs 25 journaled in the bifurcated portions 26 of the universal joint member 27. A pin 28 projects through the center of the pin 22 to prevent the withdrawal of the pin 22. The front end of the member 27 is squared as at 29, and the projecting portion of the outer globe joint member 10ª is provided with a squared socket for the squared portion 29. At 30 the interior screw threads are for the engaging of a nut 31 fitted to the smooth portion 32 of a pin having a threaded portion 33 fitted into a threaded socket in the end of the squared portion 29. This pin is provided with a slot for a screw driver for turning it into the socket, and a lock nut 34 is fitted to the reduced end for holding the parts in proper position. A pin 35 extends through the threaded portion of the member 10ª and into the nut 31. A threaded cap nut 36 is fitted to the end of the hub casting 20 and the ends are slitted so that the cap nut will firmly hold the parts in place. A leather cover or flap 37 is secured to the ball bearing ring and prevents dust and dirt from getting into the bearings.

From the foregoing it will be understood that the axles may be driven by any suitable gearing and that the steering gear will not interfere with the axle drive. The universal joint is entirely inclosed within the globe members, and can not be clogged by dust or dirt, while the ball bearings are inclosed and can be adjusted to take up lost motion and the parts firmly held in adjusted positions.

The advantages of a front and rear axle drive may be briefly referred to as follows: Skidding is prevented owing to the fact that the brakes may be applied to both axles. There is also a material saving in the wear of the tires, and the element of safety can not be lost sight of.

Referring to Fig. 5 of the drawing the rear axle is designated 1ª, while a is the lug extending from the steering band, b is the rod leading to the steering post, c is the beveled gear, e and d are the gear casings.

It will be understood that the mechanism for driving the front and rear axles, or the front axle alone, forms no part of my present invention.

I claim:

1. An axle drive comprising a globe composed of two members, one of said members being mounted partially within the other, a universal joint within said globe, one of the members of said universal joint being connected to an axle, and the other member connected to a wheel, a ball bearing ring mounted on one of the members of the globe, a steering knuckle band mounted on said ring, and a yoke connected to the axle and pivotally attached to the steering knuckle band.

2. In a device of the character described, a front axle having squared ends, a universal joint connected to each of said ends, a globe for inclosing said universal joint, said globe being composed of two members, one being movably mounted within the other, a ball bearing ring mounted upon one of the members of said globe, a steering knuckle band mounted on one of the members of said globe, and a leather cover or flap for preventing dust and dirt from entering the bearing of the ring.

In testimony whereof I affix my signature in presence of two witnesses.

HARRY M. BOYD.

Witnesses:
 CARL DAVENPORT,
 F. A. SHUTE.